United States Patent

Stansfeld

[11] Patent Number: 5,844,141
[45] Date of Patent: Dec. 1, 1998

[54] PRESSURE SENSOR HAVING STRESS SENSITIVE MEMBER

[75] Inventor: James Wolryche Stansfeld, Beech, England

[73] Assignee: Solartron Group Limited, Hampshire, England

[21] Appl. No.: 758,488

[22] Filed: Nov. 29, 1996

[30] Foreign Application Priority Data

Dec. 1, 1995 [GB] United Kingdom .................. 9524624

[51] Int. Cl.⁶ ........................................... G01L 11/00
[52] U.S. Cl. .................................................. 73/702
[58] Field of Search .......................... 73/517 AV, 702, 73/704, 708, 720, 726, 765, 766, 778, 862.41, 862.59, 862.622, 862.623

[56] References Cited

U.S. PATENT DOCUMENTS

| | | | |
|---|---|---|---|
| 3,561,832 | 2/1971 | Karrer et al. | 310/9.6 |
| 3,617,780 | 11/1971 | Benjaminson et al. | 310/8.2 |
| 4,547,691 | 10/1985 | Valdois et al. | 310/361 |
| 4,644,804 | 2/1987 | Ramm et al. | 73/862.59 |
| 5,060,526 | 10/1991 | Barth et al. | 73/702 |
| 5,317,917 | 6/1994 | Dufour et al. | 73/702 |
| 5,417,115 | 5/1995 | Burns | 73/702 |
| 5,458,000 | 10/1995 | Burns et al. | 73/708 |

FOREIGN PATENT DOCUMENTS

| | | |
|---|---|---|
| 0 473 109 A2 | 3/1992 | European Pat. Off. . |
| 0 506 554 A1 | 9/1992 | European Pat. Off. . |
| 0 611 221 A1 | 8/1994 | European Pat. Off. . |
| 55-60832 A | 5/1980 | Japan . |
| 64-10141 A | 1/1989 | Japan . |
| 944507 | 12/1963 | United Kingdom . |
| 2 178 536 B | 2/1987 | United Kingdom . |
| 2 223 311 B | 4/1990 | United Kingdom . |
| 2 233 582 A | 4/1990 | United Kingdom . |
| 93/20422 | 10/1993 | WIPO . |

Primary Examiner—William L. Oen
Attorney, Agent, or Firm—George W. Neuner

[57] ABSTRACT

A pressure sensor device 10 comprises three layers 11a, 12 and 11b of silicon, fusion-bonded together. The outer layers 11a and 11b form a sealed housing around the central layer 12 to which they are bonded, and in use a cavity 13 between the housing 11a, 11b and central layer 12 is evacuated. The sensor device 10 is normally placed inside a component for containment of a pressurised fluid (not shown). Due to the cross-sectional shape of the device 10, pressure exerted by the fluid causes the layers 11a and 11b to flex inwardly in the region of minimum cross-sectional dimension and thereby outwardly in the region of maximum cross-sectional dimension, thereby is placing under tension a balanced twin beam vibratable element 16 on the central layer 12. The tension across the vibratable element affects its resonant frequency of vibration. Accordingly by accurately measuring the resonant frequency of vibration of the element, and by comparing this to previous calibration data, the magnitude of the pressure exerted on the layers 11a and 11b may be determined. The device may be made in other materials such as quartz and/or include temperature compensation facilities.

16 Claims, 5 Drawing Sheets

PRESSURE SENSOR HAVING STRESS SENSITIVE MEMBER

BACKGROUND OF THE INVENTION

1. Field of the Invention

This invention relates to pressure sensor devices.

2. Description of the Related Art

Devices for sensing the pressure of a fluid find commercial applications in many fields ranging from oil exploration to the aerospace industry. One known type of pressure sensor uses the resonant frequency of a vibrating member mounted on a flexible diaphragm to measure a pressure exerted by a fluid. The pressure flexes the diaphragm, thereby placing the vibrating member under tension, and this affects the resonant frequency of its vibration.

Our granted United Kingdom Patent No GB 2223311 discloses a sensor device of this type in which a simple straight beam vibrating element is attached to the rear surface of a diaphragm which is exposed to the pressure. The frequency of vibration is a function of the applied pressure. A second vibrating beam, which is only attached at one end, is used to measure the temperature for temperature compensation purposes.

However, many of the known devices suffer from one or more disadvantages. Their method of construction is complex which results in poor yield and high cost of manufacture. They are also difficult to apply for very high pressure measurements, due to failure of the diaphragm where it is attached to the body of the device.

UK Patent No. GB 2178536 discloses a resonant pressure transducer in quartz in which the externally applied pressure stresses a disc shaped resonator thereby changing its resonant frequency with pressure. This construction is suitable for measurements of high pressures but is costly to manufacture and difficult to miniaturise.

It is an object of the present invention to provide a pressure sensor device in which some or all of the disadvantages of the prior art devices are reduced or eliminated.

SUMMARY OF THE INVENTION

The present invention provides a pressure sensor device for sensing fluid pressure, the device comprising a pressure-sensitive housing and bridge member located within and attached to the housing and extending across a cavity therein, to form a stress-sensitive member arranged to be placed under stress by the housing in response to a pressure exerted on the housing, characterised in that the sensor device comprises first, second and third layers, is the first and second layers substantially forming the housing and the third layer forming the bridge member, the third layer being located between the first and second layers.

Preferably the layers are bonded together to seal the cavity.

Preferably all of the layers are made from the same material in order to minimise temperature effects. Examples of suitable materials include silicon and quartz.

Using micromachining techniques the device may be made extremely small thereby minimising thermal transient effects and widening its range of application.

Other features of the present invention are set out in the appended claims to which reference should now be made.

The invention may include any combination of the features or limitations referred to herein.

BRIEF DESCRIPTION OF THE DRAWINGS

The invention may be carried into practice in various ways but an embodiment will now be described by way of example only with reference to the accompanying diagrammatic drawings in which.

DESCRIPTION OF THE PREFERRED EMBODIMENTS

Figure 1:
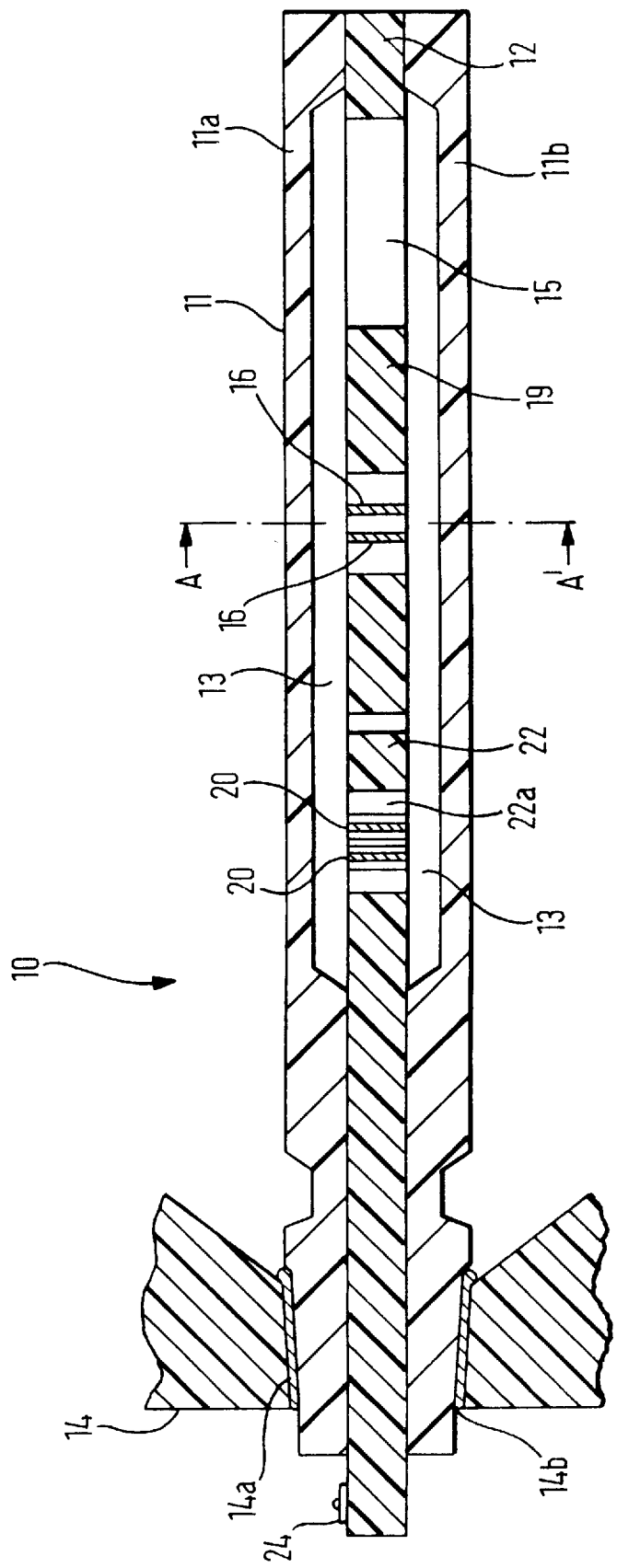
FIG. 1 shows in longitudinal cross-section a pressure sensor device according to the invention.

Referring to FIG. 1, this is a longitudinal cross-section of a pressure sensor device represented generally by the reference numeral 10 in accordance with a preferred embodiment of the present invention. The device 10 comprises a housing 11, which itself comprises two layers 11a and 11b of silicon, and a central layer 12 comprising a bridge member which bridges an evacuated cavity 13 formed within the housing 11. The housing 11 and central layer 12 are fusion-bonded together around their perimeter. The device 10 forms part of pressure measurement apparatus and except for pressure measurements of ambient air is in use sealed within a container for containing fluid, part of which is shown at 14, by a sealing material 14a, by means of a slightly tapering fit between a portion of the device 10 and an aperture 14b in the container 14.

Figure 2:
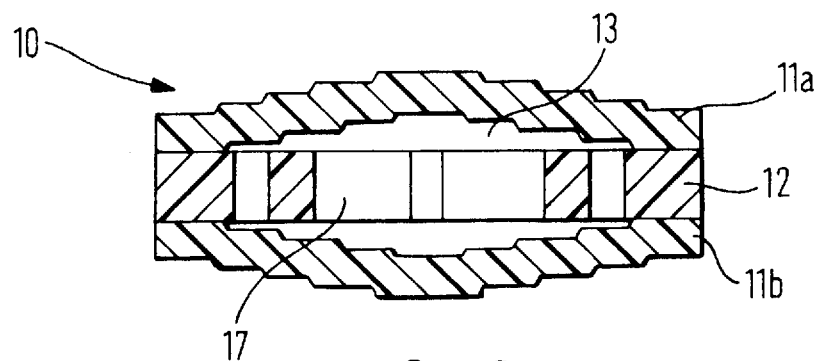
FIG. 2 shows a pressure sensor device of FIG. 1 in transverse cross-section taken along the line A—A' of FIG. 1.

FIG. 2 is a transverse cross-sectional view of the device 10 taken along the line A—A' of FIG. 1. From FIG. 2 it may be seen that the cross-sectional shape of the device is substantially elliptical or rhombic (diamond-shaped). This shape is formed in the example shown by a number of steps in the layers 11a and 11b.

Figure 3:
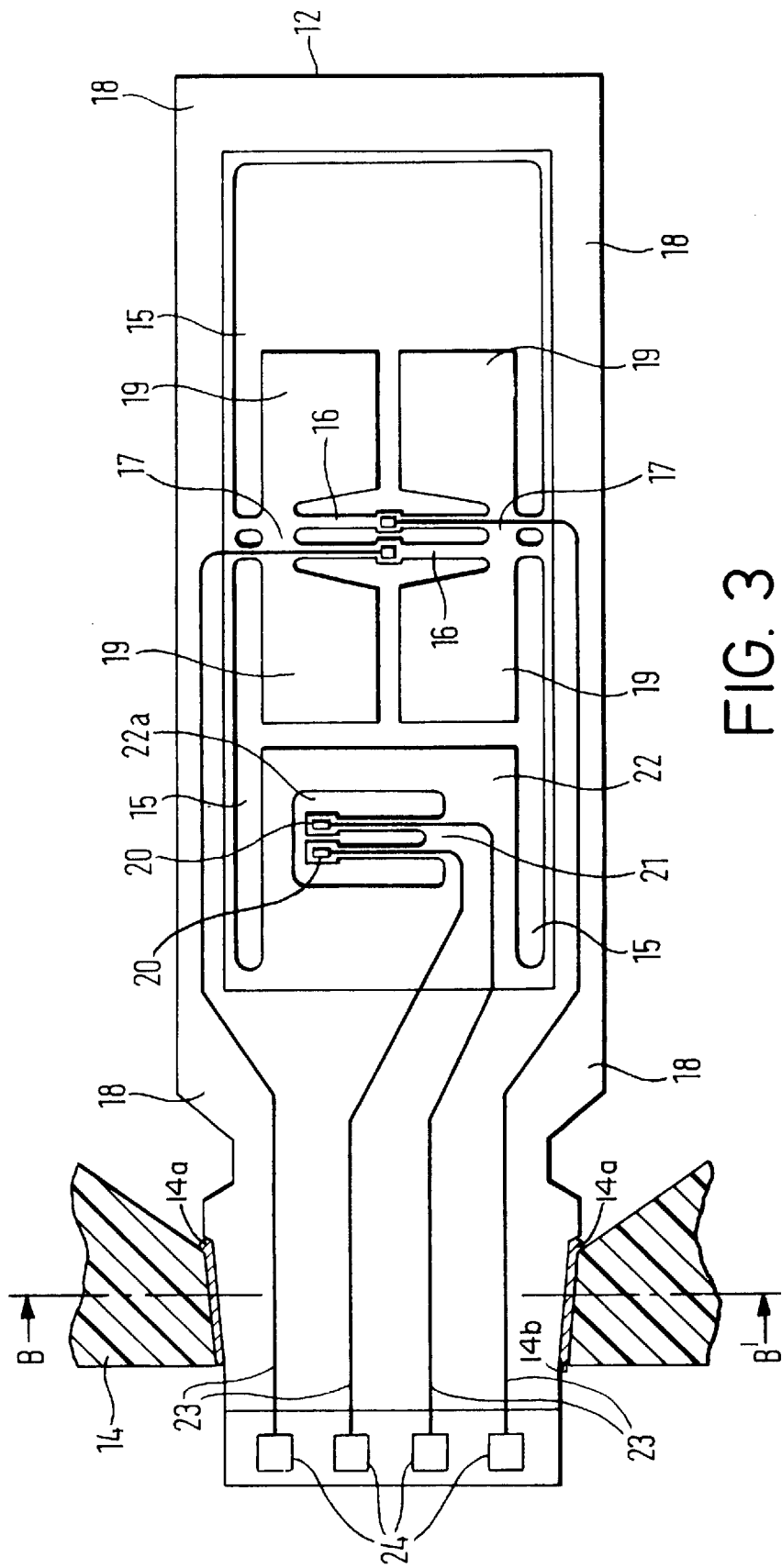
FIG. 3 shows in plan view a central layer of the device of FIG. 1.
Figure 5:
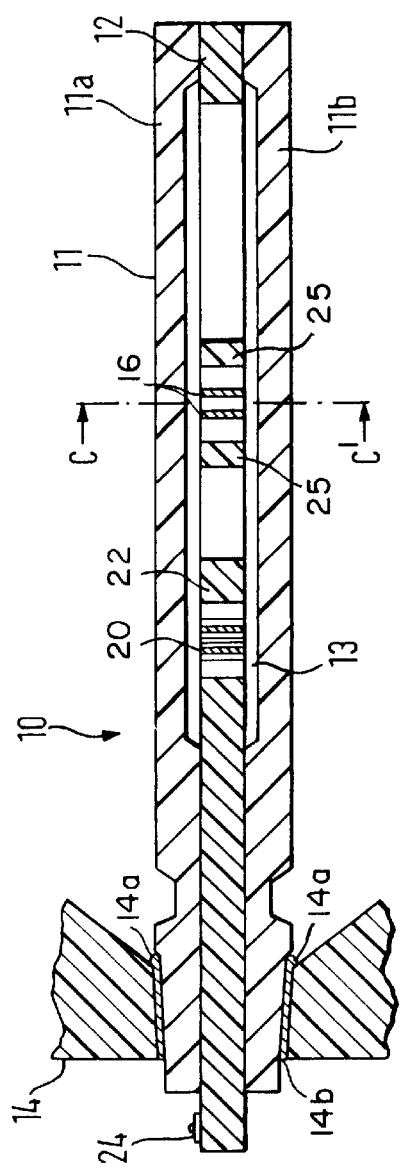
FIG. 5 shows an alternative embodiment of the invention in longitudinal cross-section.
Figure 6:
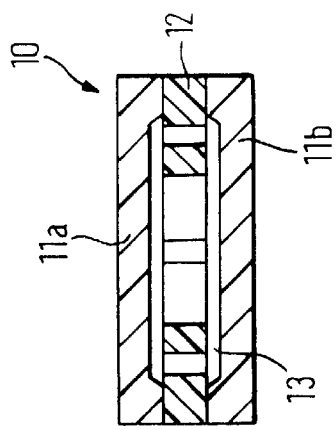
FIG. 6 shows the device of FIG. 5 in transverse cross-section taken along the line C—C' of FIG. 5.
Figure 8:
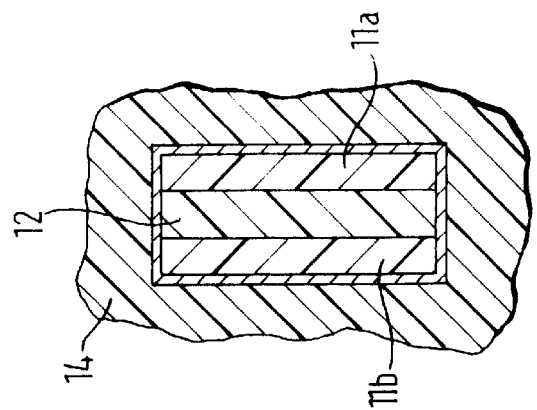
FIG. 8 shows the device of FIGS. 5 to 7 in cross-section taken along the line D—D' of FIG. 6.

FIG. 3 shows, in plan view, the central layer 12 The layer 12 is substantially rectangular as is the sensor device 10 as a whole. The layer 12 has a central aperture is 15 forming part of the cavity 13 and surrounded by a peripheral or edge region 18. Extended across the aperture in a substantially central region of the layer 12 are two beams 16 which form a twin-beam resonantly vibratable stress-sensitive member. The beams 16 are attached at their ends to node forming regions 17 and from there to the peripheral region 18 of the layer 12. The layer 12 therefore supports the stress-sensitive member 16 at the edge regions as the stress-sensitive member extends across the aperture 15. Attached to each node forming region 17 of the beams 16 there are provided relatively massive isolating members 19 which are arranged in use to isolate the vibration of the beams 16, from the rest of the layer 12. The isolating members 19 take the form of vanes which are attached by one corner to the peripheral region 18 of the layer 12 in the vicinity of the node forming regions 17.

Also within layer 12 there is provided a second resonantly vibratable structure 20, in the shape of a fork which is attached at its nodal region 21 to a generally rectangular tab portion 22 which is attached along one side to the peripheral region 18 of the layer 12. The fork structure 20 extends into an aperture 22a formed in the tab portion 22. The tines of the fork 20 are parallel to the beams 16 and thus extend in the direction transverse to the longer dimension of the substantially rectangular layer 12.

Electrically conductive channels 23 are provided from the twin vibratable beams 16 and from the vibratable fork 20 to external electrical connections 24. The purpose of the electrically conductive channels 23 is to supply an is electrical driving signal to the beams 16 and fork 20 which signal electrostatically excites them causing them to vibrate at a resonant frequency, typically within a frequency range of 10 Khz to 30 Khz. The same electrically conductive channels 23 form a capacitance pick-up which provides a signal representative of the vibration of the beams 16 and fork 20. The electrical connections 24 are, in use, connected to suitable electronic circuitry (not shown) of known type which provides the driving signals for the beams 16 and fork 20 and which, using feedback from the sensed vibrations, ensures that the driving signals maintain the beams 16 and fork 20 in resonant vibration.

The peripheral region 18 of the central layer 12 which, as noted above, is fusion-bonded to the housing layer 11a, is shown shaded in FIG. 3. On a reverse side (not shown) of layer 12 a substantially identical region 18 is fusion-bonded to housing layer 11b, the central layer 12 thus being fusion-bonded on its upper and lower surfaces to the housing layers 11a and 11b respectively.

Figure 4:
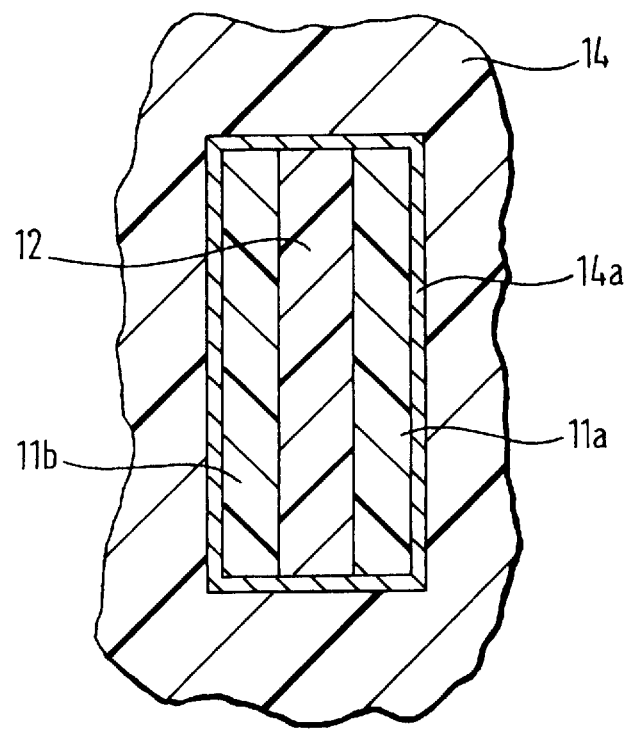
FIG. 4 shows the device of FIGS. 1 to 3 in cross-section taken along the line B—B' of FIG. 3.

FIG. 4 is a sectional view taken along line B—B' of FIG. 3, and shows the three parallel layers 11a, 12 and 11b, as well as part of the container 14.

The operation of the device 10 will now be described with reference to FIGS. 1 to 4.

In use, the external faces of the housing 11 are exposed to a fluid, the pressure of which is to be measured. Due to the difference in pressure outside the housing 11 and the evacuated cavity 13 within, the layers 11a, 11b which substantially form the housing tend to flex inwardly towards the central layer 12. By virtue of the cross-sectional shape of the housing 11 as shown in FIG. 2, a compressive force on the housing 11 causes the housing 11 to urge apart the periphery 18 of the central layer 12, to which the housing 11 is bonded. However, this urging force is restrained by the twin beams 16, thereby placing the beams 16 in tension. The tension exerted on the twin beam member is thereby a function of the compressive force exerted on the housing 11 by the fluid (not shown). In another words, when the housing layers 11a and 11b flex inwardly along the shorter cross-sectional dimension they flex outwardly along the longer cross-sectional dimension, so placing the beams 16 under stress. When such tension is applied to the vibrating beams 16 their resonant frequency of vibration changes as a function of the applied tension. Since their frequency or vibration is sensed, it is possible to obtain a measurement of the tension applied to the beams 16, and therefore of the pressure exerted on the housing by the fluid. With suitable calibration, for example using a fluid of known pressure, it is thus possible to obtain an absolute measurement of the pressure of a fluid in which the device 10 is immersed.

The thickness of the layers 11a and 11b is reduced in the regions where the cross-sectional dimension of the housing is at its maximum and/or minimum so that, for a given pressure exerted on the housing 11, more stress is applied to the beams 16, and the dependency of such stress on the material properties of the housing 11 is reduced, whilst still enabling the structure to withstand substantial overpressure.

The provision of a two beam structure 16, where the beams are of substantially identical length and mass, constitutes a balanced arrangement in which, as one beam is displaced in one direction during a half cycle of vibration, the other beam is made to displace in the opposite direction to an equal extent, ie the cycles of vibration of the two beams are in anti-phase. The resultant momentum of the pair of beams is substantially zero. Furthermore, since these beams are connected at their nodal regions to the relatively massive isolating members 19, any vibration is substantially isolated from the rest of the device 10.

The two tines of the vibratable fork member 20 are similarly balanced but their resonant frequency is unaffected by the pressure exerted on the layers 11a and 11b since they are only attached at their one ends to the layer 12 and so they cannot be placed under tension. However, the temperature in the device 10 affects the resonant frequency of the beams 16 and fork member 20 due to the temperature dependence of the dimensions and the Young's Modulus for silicon, and so the resonant frequency of the fork 20, which is independent of pressure, provides an indication as to what extent the resonant frequency of the twin beams 16 must be compensated for in order to allow for the effects of temperature.

Because the fork member 20 is of the same crystal as the beams 16 it experiences the non stress-related effects which are experienced by the beams 16. The fork member 20 therefore provides excellent common mode compensation against temperature (to the first order), ageing and thermal hysteresis. In addition, the need for an accurate clock source, used in measuring the resonant frequency of the beams 16, is obviated by the provision of the fork 20. This arises from the way in which the resonant frequencies of the beams 16 and of the fork 20 may be used to calculate the pressure exerted on the housing. For example, the signals from the beams 16 and fork 20 are divided and used to gate a signal from the high frequency clock into respective registers. If $F_p$ is the resonant frequency of the beams 16, $F_R$ is the resonant frequency of the fork 20 and $F_x$ is the clock frequency, and if both $F_p$ and $F_R$ are divided by N to gate the clock into registers $T_1$ and $T_2$ respectively then the clock cycles counted by registers $T_1$ and $T_2$ are given by:

$$\text{Register } T_1 = F_x \cdot N / F_P \qquad (1)$$

$$\text{Register } T_2 = F_x \cdot N / F_R \qquad (2)$$

Then, $$F_p / F_R = T_2 / T_1 \qquad (3)$$

Since $F_R$ is not influenced by the applied pressure, it follows that the ratio of the values in the $T_2$ and $T_1$ registers is directly related to $F_p$ and thereby related to the applied pressure. By calibration and interpolation, any applied pressure can therefore be quantified from the ratio of the values in the registers. It is further demonstrated, by the absence of the term $F_x$ in equation 3, that the ratio of the values in the $T_2$ and $T_1$ registers is independent of the clock frequency $F_x$ thereby avoiding the need for an expensive high-accuracy clock.

Figure 7:
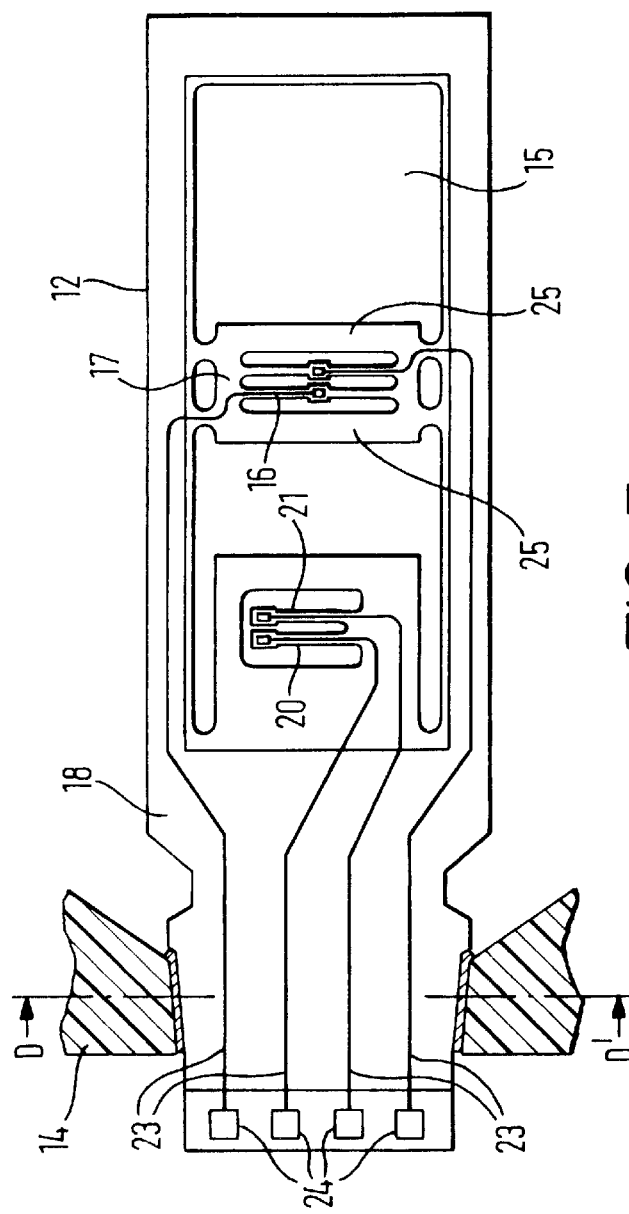
FIG. 7 shows in plan view a central layer of the device of FIG. 5.

FIGS. 5 to 8 show an alternative embodiment of the invention, in which the pressure sensor device is adapted for use in the measuring of higher pressures. The reference numerals used in FIGS. 5 to 8 correspond with those used in FIGS. 1 to 4, and the operation of the device is substantially the same as that described in relation to FIGS. 1 to 4. It may be seen from FIGS. 5 and 6 that the housing layers 11a, 11b are thicker than their counterparts shown in FIGS. 1 and 2 and that the is cavity 13 is much smaller. The reason for this is so that the layers 11a, 11b are more able to withstand higher pressures. FIG. 7 shows in plan view the central layer 12 according to the alternative embodiment. In this embodiment the relatively massive isolating members 19 of the first embodiment have been replaced by a pair of fixed gauge bars 25 which extend across the cavity 15 in parallel with the twin beams 16 to take much of the stress across the beams 16. The embodiment of the device 10 shown in FIGS. 5 to 8 is therefore more suitable for use with higher pressures without damage to the beams 16 since both the housing and the beams are less sensitive.

The manufacture of the device 10 may be by a straightforward method comprising forming the pressure-sensitive housing from first and second layers of silicon, forming both the bridge member from a third layer of silicon and forming both the stress-sensitive element and the temperature sensitive element on the bridge member. The three layers are shaped using conventional micromachining techniques. The layers are then fusion-bonded together, with the third layer being located between the first and second layers, such that the stress-sensitive element is placed under stress by the housing in response to pressure exerted on the housing, in the manner described above. The complete device 10 may be manufactured in large numbers at wafer level which reduces manufacturing costs and makes handling easier. In addition, the sandwich structure of three layers has several major advantages. Firstly, because the silicon layers are bonded together around their periphery, the internal reference vacuum, which is generated as part of the wafer bonding process, is entirely contained by silicon, thus providing good long term stability. Since the electrically conductive channels 23 may be integrally formed in the layer 12 by conventional techniques such as doping, it is not necessary to provide elaborate sealing arrangements at the points at which the channels 23 emerge from the vacuum enclosure in order to preserve the vacuum within the device, as was the case with some previous pressure sensor devices. In addition, the structure of the device is such that the joints between adjacent bonded layers are always in compression due to the pressure exerted on the exterior of the device. This further aids the long term reliability of the device as the joints are less prone to damage or failure than if they were continually placed under tension.

A further advantage of the device 10 is its versatility. The extent to which the housing layers 11a and 11b flex under the influence of external pressure may be adjusted by micro-machining those layers. Accordingly a standard device may be constructed initially, and then specific devices may be micro-machined to differing extents according to their required sensitivity. This advantageously enables the manufacture of one basic device to be used for pressure sensing over a wide range of pressures.

A still further advantage with the device 10 arises from its mounting in the container 14. The portion of the container 14 shown in FIG. 1 typically comprises a closed end of a hollow cylinder into which the device 10 projects, and into which fluid is introduced, normally through an aperture at the opposite end (not shown). The tapering fit of the device 10 in the container 14 together with the pressure of fluid within the container 14 in use, ensures that the joint between the device 10 and container 14 remains in compression. This is good for reliability and also means that the sealing material 14a, which is typically an adhesive, is sufficient for the sealing of the joint, i.e. it is not necessary to perform a bonding operation to make the joint.

Whilst the device 10 has been described in relation to the making of measurements of absolute pressure, a pair of the devices 10 could readily be used to make measurements of differential pressure.

It will be apparent to the skilled person that various modifications may be made to the invention without departing from its scope.

For example, whereas in the above-described embodiment a pair of resonantly vibratable beams 16 is used as a stress-sensitive element, other forms of stress-sensitive device may be employed such as, for example, a strain gauge. Furthermore, whilst the above-described example was constructed from silicon, alternative materials such a quartz may be employed. Where the bonding process for the three layers does not in itself generate an evacuated cavity, provisions can be included to enable adequate evacuation and sealing as a follow on process. For example, evacuation of the cavity may be achieved through a capillary tube which is retained from the cavity to outside of the housing during bonding, and which, after evacuation of the cavity, is sealed.

The invention claimed is:

1. A pressure sensor device for sensing fluid pressure, the device comprising a pressure-sensitive housing and a bridge member located within and attached to the housing and extending across a cavity therein, to form a stress-sensitive member arranged to be placed in stress by the housing in response to pressure exerted on the housing, characterized in that the sensor device comprises first, second and third substantially rectangular layers, the first and second layers substantially forming the housing and the third layer forming the bridge member, the third layer being located between the first and second layers and defining an aperture, wherein the stress-sensitive member extends across the aperture between edge regions of the third layer in a direction transverse to the longer dimension of the substantially rectangular third layer.

2. A device according to claim 1, wherein the housing is generally elliptical or rhombic in cross-section, and the stress-sensitive member of the bridge member extends across a larger one of two dimensions of the cross-section.

3. A device according to claim 1 wherein the thickness of the first and second layers is reduced in the regions where the cross sectional dimension of the housing is at its maximum and/or minimum.

4. A device according to claim 1 wherein the stress sensitive member is supported on each side by gauge bars for reducing the stress in the stress sensitive member.

5. A device according to claim 1 wherein the cavity is arranged to be evacuated and sealed by bonding the layers together.

6. A device according to claim 1 wherein the stress-sensitive member comprises a first resonantly vibratable element, the resonant frequency of which is arranged to vary with applied stress.

7. A device according to claim 6, wherein the first vibratable element comprises an elongate beam joined at both ends to the bridge member.

8. A device according to claim 7, wherein the first vibratable member comprises two elongate beams, of substantially the same dimensions and being arranged in use to vibrate in opposite phase with respect to each other.

9. A device according to claim 7 wherein at each end of the elongated beam or beams, and joined thereto, there is provided a node-formingm isolating member arranged in use to minimize the exchange of energy between the elongate beams and the rest of the device.

10. A device according to claim 1 wherein the device comprises temperature sensitive means.

11. A device according to claim 10, wherein the temperature sensitive means comprises a second vibratable element formed on the third layer and arranged in use to vibrate at a resonant frequency with resonant frequency varies with temperature and is independent of the pressure outside of the housing.

12. A device according to claim 11, wherein the second vibratable element comprises an elongate beam joined at only one end to the rest of the third layer and arranged in use to vibrate in a manner such that its sensitivity to temperature change is substantially the same as that of the first vibratable element.

13. A device according to claim 11 wherein the second vibratable element comprises a fork structure having two tines, wherein the tines are arranged in use to vibrate in antiphase.

14. A device according to claim 6 wherein electrical drive signals are supplied to the vibratable elements via electrically conductive channels formed at least partly within the third layer.

15. A device according to claim 1 wherein the device is mounted in a container for containing fluid, in a tapering joint such that the joint is put into compression when the pressure of the fluid in the container is increased.

16. A method of fabricating a pressure sensitive device, for sensing fluid pressure, characterized in that, the method comprises forming a pressure-sensitive housing of the device from substantially rectangular first and second layers of material, forming a bridge member from a substantially rectangular third layer of said material, forming an aperture on a portion of the bridge member, forming a stress-sensitive element across the aperture between edge regions of the third layer, so that the stress-sensitive element extends in a direction transverse to the longer dimension of the substantially rectangular third layer, and bonding the layers together, wherein the third layer is located between the first and second layers, such that the stress-sensitive element is arranged in use to be placed under stress by the housing in response to pressure exerted on the housing.

\* \* \* \* \*